United States Patent [19]

Droste et al.

[11] Patent Number: 4,727,458

[45] Date of Patent: Feb. 23, 1988

[54] DIMMED MOTOR VEHICLE HEADLIGHT

[75] Inventors: Heinz Droste; Wolfgang Peitz, both of Erwitte; Heinrich Schäfer, Geseke, all of Fed. Rep. of Germany

[73] Assignee: Westfälische Metall Industrie KG, Hueck & Co., Lippstadt, Fed. Rep. of Germany

[21] Appl. No.: 869,127

[22] Filed: May 30, 1986

[30] Foreign Application Priority Data

May 30, 1985 [DE] Fed. Rep. of Germany ....... 3519271

[51] Int. Cl.[4] .............................................. B60Q 1/12

[52] U.S. Cl. ...................................... 362/61; 362/310; 362/303; 362/329; 362/346

[58] Field of Search .................. 362/61, 80, 310, 303, 362/346, 329, 286, 287

[56] References Cited

U.S. PATENT DOCUMENTS 1,539,090 5/1925 King .................................. 362/329

1,700,760 2/1929 Brewer ............................... 362/268

3,598,989 8/1971 Biggs .................................. 362/329

4,517,630 5/1985 Dieffenbach et al. ............. 362/310

4,577,260 3/1986 Tysoe ................................. 362/268

FOREIGN PATENT DOCUMENTS 589772 11/1933 Fed. Rep. of Germany ...... 362/268

*Primary Examiner*—James C. Yeung

*Attorney, Agent, or Firm*—Horst M. Kasper

[57] ABSTRACT

The invention refers to a motor vehicle projection headlight, where the projection lens is in part covered by a light transmitting plate. The light transmitting plate has edge regions which are of a wider diameter than the lens. An annular light impermeable cover, which surrounds the lens immediately and at a small distance, is disposed at a distance to the edge region of the light permeable plate. The surface of the cover toward the light transmitting plate is of high reflectivity.

29 Claims, 2 Drawing Figures

DIMMED MOTOR VEHICLE HEADLIGHT

BACKGROUND OF THE INVENTION

1. Field of the Invention

The invention relates to a dimmed motor vehicle headlight according to the projection principle, where a projection lens is covered by a light transmitting plate, and where edge regions of the light transmitting plate going beyond the rim of the lens are covered in part on the rear side by a light impermeable cover.

2. Brief Description of the Background of the Invention Including Prior art

A projection headlight has the general advantage that it generates sharply delimited dimmed light and even though the projection surface of the projection face of the lens is small, it appears to a casual observer as a headlight of conventional size. The impermeable covering shields the very large insertion opening of the motor vehicle body in part from view from the outside, since the projection headlight is substantially smaller. In addition, for a larger surface construction of the light transmitting plate, it is possible to clean the full region used for passing light beams for the dimmed light with a single wiper blade. For a light transmitting plate of the size of the light exiting surface of the projection headlight, the wiper blade would not be able to cover the edge regions of the plate. In addition, in the case of a large surface plate, a light bulb for an indicating light can be inserted on the side of the lens.

Such a projection headlight is described in the German Patent DE-GM No. 84 27 338 where a light impermeable covering of a light transmitting disk in the disk's edge regions surrounding the lens consists of a coating placed on the inside of the light transmitting disk. In this case the view from the outside into the insertion opening on the side of the lens is only partially protected, since the light transmitting disk, because of the convex shape of the lens and because of a possible inclination and/or canting of the disk adapted to the shape of the automobile body, is disposed at a relatively large distance from the lens. Thus, it is desirable to keep the distance between the light transmitting plate and lens relatively small.

In addition, the coating placed directly on the light transmitting disk does not generate a pleasant aesthetic view as is the case in conventional headlights, where the large surface light transmitting plate corresponds in its outer dimensions about to the light emitting surface of the reflector. Also, light beams exiting from the coiled filament bulb or reflected interfering beams can undesirably illuminate partial regions of the coating applied at the edge regions of the light transmitting plate.

SUMMARY OF THE INVENTION

1. Purposes of the Invention

It is an object of the present invention to provide a motor vehicle headlight according to the projection principle, where the lens is covered by a large surface light transmitting plate formed in such a way that the view from the outside into the projection headlight's large insertion opening in the automobile body or into the headlight's large inner space is fully shielded.

It is another object to provide an automobile projection headlight that when switched off looks nearly identical to a conventional motor vehicle headlight or at least is very similar to it based on the visual impression generated.

It is yet another object of the present invention to provide a motor vehicle headlight where the light transmitting plate is constructed with a surface large enough that the cleaning of the plate with a wiper plate is possible for the full region of the plate passing dimmed light and where in addition a parking light can be placed next to the side of the lens.

These and other objects and advantages of the present invention will become evident from the description which follows.

2. Brief Description of the Invention

The present invention provides a dimmed motor vehicle headlight which includes a light source disposed closely spaced to a focal point of a reflector, a diaphragm disposed in front of the light source, a lens disposed in front of the diaphragm such that an edge of the diaphragm is near a focal point of the lens, a light-impermeable ring-shaped cover disposed in front of the lens for surrounding the lens at a close distance and having an opening of about the diameter of the lens, a light-transmitting protective plate disposed in front of the lens and ring-shaped cover and covering the lens and the ring-shaped cover, where the side of the ring-shaped cover toward the light transmitting plate is provided with a reflective surface.

The reflective surface of the cover can have silver color, can be smooth and reflect at least about 75 percent of impinging visible light. The reflective surface of the cover preferably reflects at least about 90 percent of the incoming light over a wavelength region of from 400 to 600 millimicrons. The cover can be provided like a shell. A concave side of the cover can be directed toward the light permeable protective plate. The front surface of the cover plate can be highly reflecting. The reflecting surface can include a large number of individual reflecting surfaces, which reflect light impinging from the outside into a large number of directions. The ring-shaped cover can include an opening for receiving a lamp for an indicating light.

The reflective region of the cover can be formed like a valley recess around the opening for a parking light. The valley recess can form a reflector matching the position of a coiled filament wire of the parking light. The coiled filament wire of the parking light can be so disposed on the ring-shaped cover and the ring-shaped cover can be so constructed that part of the light emitted by the headlight impinges on the front surface of the ring-shaped cover and is reflected from there substantially uniformly in the direction through the light transmitting plate.

The valley recess can follow a spherical shape, where the center of the sphere is disposed outside of a cylinder around the optical axis having the outer radius of the cover. The valley recess is preferably formed as an integral part of the ring-shaped cover in a mold used for forming the ring-shaped cover. The valley recess is preferably disposed near a backward surrounding bend of the ring-shaped cover. An average of inner radius $r_i$ of the concave cover and of outer radius $r_o$ of the concave cover can be a middle cover radius $r_m$. The optical axis of the parking light can pass at an intersection point through the ring-shaped cover as projected onto a plane perpendicular to the lamp axis, and the intersection point can be farther outward than the middle cover radius of the ring cover and can correspond to a radial point in the region of from about $(0.55*r_o+0.45*r_i)$ to $(0.75*r_o+0.25*r_i)$ of the radial extension of the ring.

The socket of the indicating lamp is preferably disposed directly at the ring-shaped cover. The inner edge of the ring-shaped cover can be disposed between two planes perpendicular to the optical axis of the headlight, which planes correspond to the point of one third and of two thirds of the thickness of the lens on the optical axis. The parking light can have an axis which forms an angle of from about 5 to 20 degrees and preferably from about 8 to 15 degrees with the optical axis of the head light such that a closest contact point of the two axes is in front of the headlight.

The ring-shaped cover can be provided with a flange at its outer edge. The outer edge of the ring-shaped cover is preferably bent backwards and then bends into a flange for mounting on a headlight support, where the width of the backward bent area is from about 0.3 to the full thickness of the lens.

The light transmitting protective plate can be provided with a short tubular rear extension around its circumference, the rear end of the extension resting on the front side of the flange of the ring-shaped cover plate. The inner diameter of the ring-shaped cover can have a diameter corresponding to from about 0.8 to 1 of the diameter of the lens. The inner diameter of the ring-shaped cover corresponds preferably to from about 0.9 to 1 of the diameter of the lens. The position of the inner edge of the ring-shaped cover along the optical axis can correspond to the rear half of the lens, where the position of the front outer bend of the ring-shaped cover corresponds to the front half of the lens and where the outer flange part of the ring-shaped cover corresponds to the rear half of the lens along the optical axis.

Thus, according to the present invention the cover for the light transmitting plate is formed by a light impermeable part having a ring shape and disposed at a distance from the light permeable plate. The cover surrounds the lens immediately and at a very small distance and the side of the cover toward the plate is provided with a reflecting coating. Because of the light impermeability of the separate cover, this construction provides that light beams exiting immediately from the light bulb or reflecting interfering beams are shielded from exiting to the outside.

It is further advantageous if the covering is provided in the form of a shell, where the concave side is directed toward the front, light exiting direction and where the reflecting surface of the covering is a high gloss surface or, alternatively, comprises many individual reflective faces, which reflect light coming in from the outside into different directions. Thus the appearance of the projection headlight while switched off resembles still more the appearance of a headlight of conventional construction and dimensions.

According to a particular embodiment of the invention it is furthermore advantageous if the ring shaped cover is provided with an opening suitable for receiving a parking light bulb and where the reflection region of the covering around the opening for the parking light is formed like a valley recess that provides a reflector adapted to this specific position of the coiled filament wire of the parking light bulb. In this context, the ring shaped cover not only serves in an advantageous manner for the reception of the parking light bulb, but furthermore provides a reflector directing the light of the parking light bulb.

According to a further advantageous embodiment of the invention, the light bulb for the parking light is so positioned in the reflector shaped cover, and the reflector like ring shaped cover so is constructed that a part of the light emitting from the light bulb indirectly impinges on the front side of the ring shaped cover and is reflected from this ring shaped cover as uniformly as possible in the light exiting direction. Thereby, in case the headlight is turned on, the full large surface of the transparent plate is illuminated such that the headlight acts as a signal for oncoming motor vehicle traffic at a distance and at various angles.

It is further advantageous, if this socket for the light bulb for the parking lamp is furnished and attached immediately at the ring shaped cover. With such a simple and cost saving solution, the light transmitting plate has to be removable from the headlight in order to allow for an exchange of the light bulb.

It is furthermore advantageous, if the ring shaped cover is provided with a backwardly receding outer edge. This backwardly receding outer edge provides the cover with a high stiffness. In addition, in case of a light transmitting plate provided with a backwardly receding edge, the distance of such a shell formed cover to the transparent plate can be selected to be very small in order to obtain depths as large as possible of the shell-formed cover, to shield a view from the outside into the insertion opening of the motor vehicle body, and to shield against light emitting directly from the light bulb.

The annular section of the ring-shaped cover forms a sphere segment with a concave reflection surface. The ratio of the outer diameter of the ring-shaped cover relative to the radius of the sphere can be from about 1:1 to 1:2. The ratio of the radius of the annular ring-shaped cover to the diameter of the spherical recess can be from about 1.5:1 to 2:1.

There is also provided a method for production of a dimmed motor vehicle headlight which comprises forming a light reflector, disposing a light source closely spaced to a focal point of the reflector, placing a diaphragm in front of the light source, disposing a lens in front of the diaphragm such that an edge of the diaphragm is near a focal point of the lens, forming a light-impermeable ring-shaped cover, disposing the light-impermeable ring-shaped cover in front of the lens for surrounding the lens at a close distance and having an opening of about the diameter of the lens, disposing a light-transmitting protective plate in front of the lens and ring-shaped cover and covering the lens and the ring-shaped cover, where the side of the ring-shaped cover toward the plate is provided with a reflective surface. The ring-shaped cover can be produced by die-casting, by plastic injection-molding or by punching the ring-shaped cover from sheet metal and then forming the punched sheet metal into the ring-shaped cover.

The novel features which are considered as characteristics for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENT

Figure 1:
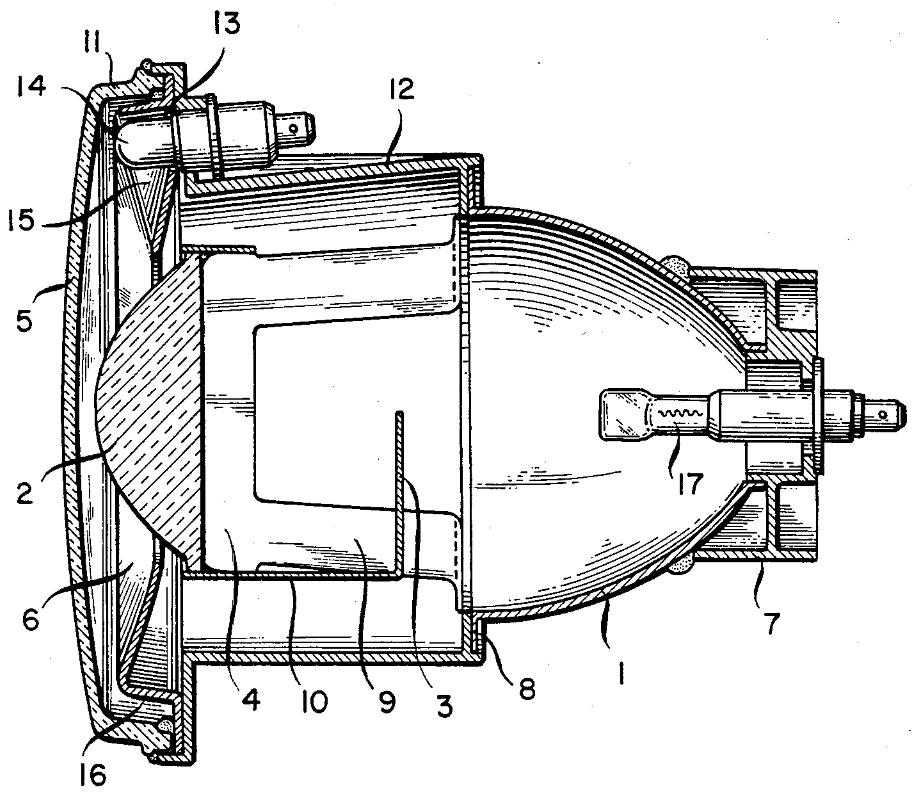
FIG. 1 shows a schematic vertical longitudinal sectional view of the optical axis of a motor vehicle headlight covered with a light transmitting plate according to the projection principal.
Figure 2:
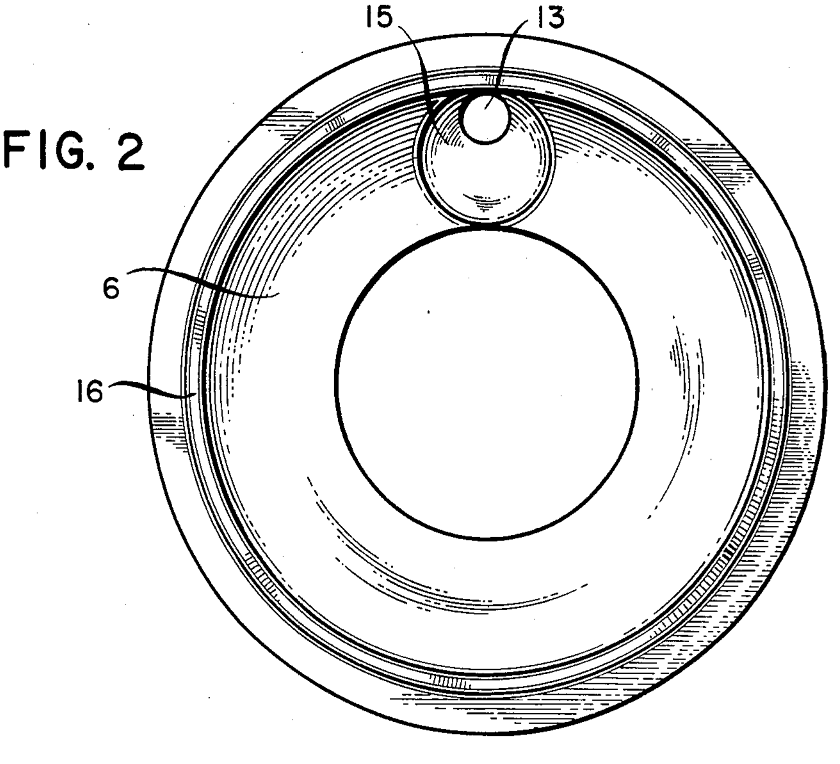
FIG. 2 is a front view of a ring shaped cover disposed at a distance to the light transmitting plate.

In accordance with the present invention there is provided a motor vehicle headlight with a projection lens, where the projection lens is covered in part by a light impermeable cover. The edge regions of the cover protrude on the side beyond the lens and are formed by an annular light-impermeable ring disposed at a distance from the light transmitting plate covering the light emitting surface of the headlight. The cover is closely spaced surrounding the lens and the side of the cover toward the light transmitting plate is of a highly reflective material. The ring-shaped cover preferably has a shape of a sphere segment, where the center of the sphere is disposed on the optical axis in front of the headlight. A reflection surface of the sphere segment is disposed toward the light-transmitting plate.

The motor vehicle headlight shown in the drawing and operating according to the projection principle comprises substantially an ellipsoidal reflector 1, which is followed by the lens 2 and the frame 4 supporting the diaphragm 3. The light transmitting plate 5 covers the lens 1 and a ring shaped cover 6 is placed at a distance relative to the large area plate 5. The distance between cover and light transmitting plate can be larger than the thickness of the cover or than the thickness of the light transmitting plate.

The light transmitting plate can be made of glass or plastic and is provided on its inner side with optical means such as an anti-reflection coating. The edge region of the light transmitting plate protruding on the side beyond the collector lens is covered on its inner side with cylinder lenses running parallel to each other. The cylinder lenses run vertically in their longitudinal extension in the mounted position of the headlight. Such cylinder lenses scatter the light reflected by the ring-shaped cover of the parking light bulb, and, in addition, they shield a view from the outside into the interior of the headlight. The region of the light-transmitting plate disposed in front of the collector lens can remain free of optical beam modifying means or can at least in part be provided with optical beam modifying means. These optical beam modifying means can serve to illuminate the edge of the road lane in a relatively improved way, and they can provide for a better mixing of the spectral colors generated in the headlight system.

The lamp socket 7 supporting the light bulb 17 is inserted at the vertex of the preferably ellipsoidal reflector 1 and is adhesively connected to the back side of the reflector. A web 9 cut free from a cup shaped frame is attached with outer angled free ends near or at an outer surrounding edge 8 of the reflector 1. The web 10 cut free from the cup is angled toward the optical axis and serves with its free end section as a diaphragm. The floor of the cup shaped frame 4 is cut out and serves to receive the lens 2.

The ring-shaped cover can be made by various processes. It can be made by diecasting, which is described for example in the book *Principles of Metal Casting* by Heine, Loper, Rosenthal, McGraw-Hill Book Company, New York, 1967. Another production method is the stamping of sheet metal followed by sheet metal deformation. Such deformation methods are described for example in the book *Modern Metal Working* by John R. Walker published by The Goodheart-Willcox Co., Inc., South Holland, Ill. 1970 and in *Techniques of Press-working Sheet Metal* by Donald F. Eary and Edward A. Reed, Prentice-Hall Inc., Publishers (1958). Another method for forming the ring-shaped cover is by injection molding, which is described for example in the book *Materials and Processes* in Manufacturing by E. Paul DeGarmo, Macmillan Publishing Co., New York, Fourth edition, 1974.

The outer edge receding toward the rear side 11 of the light transmitting disk 5 is adhesively attached at the ring shaped cover 6 with a tubular shaped sheet metal piece 12, where the ring shaped cover 6 is located at a distance to the light transmitting plate. The adhesion can be provided with an adhesive caterpillar or with an injection pistol. The adhesive can be thermosetting and/or curing in a furnace and preferred is a slow oven-curing adhesive.

The outer surrounding flange of the ring-shaped cover, together with the outer edge region of the light-transmitting disk, is adhesively attached to the tubular plastic part disposed between light-transmitting disk and reflector. Preferably the attachment is provided with an adhesive worm or with an injection pistol. The adhesive material can be a two-component adhesive, which preferably is slow curing under application of elevated temperature.

The sheet metal part 12 is attached to the outer surrounding edge 8 of the reflector. The ring-shaped cover 6 can be made from sheet metal and formed like a shell, where the concave side is directed toward the exit direction of the light from the head lamp. The side of the cover 6 directed to the light transmitting disk 5 is constructed of high gloss and reflectivity. An opening 13 is provided in the cover 6 for receiving the parking light bulb 14. The reflection region 15 of the covering 6 around the light bulb is formed like a valley recess. The valley recess 15 forms a reflector constructed to match the position of the coiled filament wire of the parking lamp 15. The remaining reflection region of the shell-like cover 6 is constructed such that a part of the light exiting from the position of the parking light bulb 14 impinges on the cover and is distributed as uniformly as possible and reflected into the light exiting direction. In order to obtain a reflection surface of the shell shaped cover 6 as large as possible, the distance between the light transmitting plate 5 and the lens is maintained relatively small. The outer surrounding edge 16 of the cover 6 is constructed receding in the rear direction.

The valley recess can have the shape of a sphere segment. The vertex point of the segment is disposed as close as possible to the outer edge of the ring-shaped cover. The segment has around the vertex point an opening for receiving the parking light socket and bulb. Thereby the reflection surface of the segment is constructed as big as possible. According to a preferred embodiment the valley recess having the shape of a sphere segment is provided with individual reflection surfaces scattering the light of the parking lamp, while the remainder of the ring-shaped cover is provided as a smooth uniform surface free from individual area reflecting surfaces that would scatter the light.

The socket of the parking light is introduced from the back-side of the headlight with the glass bulb of the parking lamp going first into the opening of the ring-shaped cover. The socket is fixed in its position in the opening of the tubular plastic part 12 disposed between light transmitting plate and reflector with a slide-type spring lock.

It will be understood that each of the elements described above, or two or more together, may also find a useful application in other types of light collection system configurations and road illuminating procedures differing from the types described above.

While the invention has been illustrated and described as embodied in the context of a motor vehicle projection headlight, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A dimmed motor vehicle headlight comprising
- a lamp socket;
- a light reflector attached to the lamp socket;
- a light source supported by the lamps socket and disposed closely spaced to a focal point of the reflector;
- a diaphragm rigidly connected to the light reflector and disposed in front of the light source;
- a lens rigidly connected to the light reflector and disposed in front of the diaphragm such that an edge of the diaphragm is near a focal point of the lens;
- a light-impermeable ring-shaped cover fixedly disposed in front of the lens for surrounding the lens at a close distance and having an opening of about the diameter of the lens and wherein the outer edge of the ring-shaped cover is bent in the direction of the diaphragm so as to form a recess mounting area for the light-impermeable ring-shaped cover, and where a concave side of the cover is directed toward the light permeable protective plate;
- a light-transmitting protective plate fixedly disposed in front of the lens and light-impermeable ring-shaped cover and covering the lens and the light-impermeable ring-shaped cover, where the side of the light-impermeable ring-shaped cover toward the light transmitting protective plate is provided with a reflective surface.

2. The dimmed motor vehicle headlight according to claim 1 wherein the reflective surface of the light-impermeable ring-shaped cover reflects at least about 90 percent of the incoming light over a wavelength region of from 400 to 600 millimicrons.

3. The dimmed motor vehicle headlight according to claim 1 wherein the front surface of the light-impermeable ring-shaped cover is of silver color, has a smooth surface and reflects more than about 75 percent of impinging visible light.

4. The dimmed motor vehicle headlight according to claim 1 wherein the reflecting surface includes a large number of individual reflecting surfaces, which reflect light impinging from the outside into a large number of directions.

5. The dimmed motor vehicle headlight according to claim 1 wherein the concave side of the light-impermeable ring-shaped cover directed in the light emission direction is formed by an annular sphere section, where the center of the sphere is disposed on the optical axis of the headlight.

6. The dimmed motor vehicle headlight according to claim 1 wherein the light-impermeable ring-shaped cover includes an opening for receiving a lamp for a parking light.

7. The dimmed motor vehicle headlight according to claim 6 wherein the reflection region of the light-impermeable ring-shaped cover is formed like a valley recess around the opening for the parking light.

8. The dimmed motor vehicle headlight according to claim 7 wherein the valley recess forms a reflector matching the position of an coiled filament wire of the parking light.

9. The dimmed motor vehicle headlight according to claim 8 wherein the valley recess in the light-impermeable ring-shaped cover has the shape of a spherical segment.

10. The dimmed motor vehicle headlight according to claim 9 wherein the sphere has a radius and wherein the ratio of the outer diameter of the light-impermeable ring-shaped cover relative to the radius of the sphere, the annular section of which forms the concave reflection surface of the ring-shaped cover, is from about 1:1 to 1:2.

11. The dimmed motor vehicle headlight according to claim 9 wherein the ratio of the radius of the annular ring-shaped cover to the diameter of the spherical recess is from about 1.5:1 to 2:1.

12. The dimmed motor vehicle headlight according to claim 8 wherein the valley recess follows a spherical shape, where the center of the sphere is disposed outside of a cylinder around the optical axis having the outer radius of the cover, wherein the valley recess is formed as an integral part of the light-impermeable ring-shaped cover in a mold used for forming the light-impermeable ring-shaped cover and where the valley recess is disposed near a backward surrounding bend of the light-impermeable ring-shaped cover.

13. The dimmed motor vehicle headlight according to claim 8 wherein an average of inner radius $r_i$ of the concave cover and of outer radius $r_o$ of the concave cover is a middle cover radius $r_m$, wherein the parking light has an optical axis and where the optical axis of the parking light passes at an intersection point through the ring-shaped cover as projected onto a plane vertical to the lamp axis, which intersection point is farther outward than the middle cover radius of the light-impermeable ring-shaped cover and where the intersection point corresponds to a radial point in the region of from about $(0.55*r_o+0.45*r_i)$ to $(0.75*r_o+0.25*r_i)$ of the radial extension of the ring.

14. The dimmed motor vehicle headlight according to claim 8 wherein the socket of the indicating lamp is disposed directly at the light-impermeable ring-shaped cover.

15. The dimmed motor vehicle headlight according to claim 8 wherein the inner edge of the light-impermeable ring-shaped cover is disposed between two planes vertical on the optical axis of the headlight, which planes correspond to the point of one third and of two thirds of the thickness of the lens on the optical axis.

16. The dimmed motor vehicle headlight according to claim 8 wherein the parking light and its reflector have an axis which forms an angle of from about 5 to 20 degrees with the optical axis of the head light such that a closest contact point of the two axes is in front of the headlight.

17. The dimmed motor vehicle headlight according to claim 6 wherein the coiled filament wire of the parking light is so disposed on the light-impermeable ring-shaped cover and where the light-impermeable ring-shaped cover is constructed such that part of the light emitted by the headlight impinges on the front surface of the light-impermeable ring-shaped cover and is reflected from there substantially uniformly in the direction through the light transmitting plate.

18. The dimmed motor vehicle headlight according to claim 1 wherein the ratio of the outer diameter of the light-impermeable ring-shaped cover relative to the radius of the sphere, the annular section of which forms the concave reflection surface of the ring-shaped cover, is from about 1:1 to 1:2.

19. The dimmed motor vehicle headlight according to claim 1 wherein the light-impermeable ring-shaped cover is provided with a flange at its outer edge.

20. The dimmed motor vehicle headlight according to claim 1 wherein the outer edge of the light-impermeable ring-shaped cover beyond its backward bent is then bent into a flange for mounting on a headlight support, where the width distance of the backward bent area is from about 0.3 to the full thickness of the lens.

21. The dimmed motor vehicle headlight according to claim 1 wherein the light transmitting protective plate is provided with a short tubular rear extension around its circumference, the rear end of the extension resting on the front side of the flange of the light-impermeable ring-shaped cover.

22. The dimmed motor vehicle headlight according to claim 1 wherein the inner diameter of the light-impermeable ring-shaped cover has a diameter corresponding to from about 0.8 to 1 of the diameter of the lens.

23. The dimmed motor vehicle headlight according to claim 1 wherein the inner diameter of the light-impermeable ring-shaped cover corresponds to from about 0.9 to 1 of the diameter of the lens.

24. The dimmed motor vehicle headlight according to claim 1 wherein the position of the inner edge of the light-impermeable ring-shaped cover along the optical axis corresponds to the rear half of the lens, where the position of the front outer bend of the light-impermeable ring-shaped cover corresponds to the front half of the lens and where the outer flange part of the light-impermeable ring-shaped cover corresponds to the rear half of the lens along the optical axis.

25. A method for production of a dimmed motor vehicle headlight wherein the motor vehicle is provided with an opening for a parking light comprising forming a light reflector;

disposing a light source closely spaced to a focal point of the reflector;

placing a diaphragm in front of the light source;

disposing a lens in front of the diaphragm such that an edge of the diaphragm is near a focal point of the lens;

forming a light-impermeable ring-shaped cover wherein the outer edge of the ring-shaped cover is bent in the direction of the diaphragm so as to form a recess mounting area for the light-impermeable ring-shaped cover, and where a concave side of the cover is directed toward the light permeable protective plate;

disposing the light-impermeable ring-shaped cover in front of the lens for surrounding the lens at a close distance and having an opening of about the diameter of the lens;

a light-transmitting protective plate disposed in front of the lens and light-impermeable ring-shaped cover and covering the lens and the light-impermeable ring-shaped cover, where the side of the light-impermeable ring-shaped cover toward the light transmitting protective plate is provided with a reflective surface.

26. The method for production of a dimmed motor vehicle headlight according to claim 25 further comprising diecasting the light-impermeable ring-shaped cover.

27. The method for production of a dimmed motor vehicle headlight according to claim 25 further comprising injection molding the light-impermeable ring-shaped cover.

28. The method for production of a dimmed motor vehicle headlight according to claim 25 further comprising punching a sheet metal blank having contours corresponding to the light-impermeable ring-shaped cover from sheet metal; and forming the punched sheet metal into the light-impermeable ring-shaped cover.

29. A dimmed motor vehicle headlight comprising a lamp socket;

a light reflector attached to the lamp socket;

a light source supported by the lamps socket and disposed closely spaced to a focal point of the reflector;

a diaphragm rigidly connected to the light reflector and disposed in front of the light source;

a lens rigidly connected to the light reflector and disposed in front of the diaphragm such that an edge of the diaphragm is near a focal point of the lens;

a light-impermeable ring-shaped cover fixedly disposed in front of the lens for surrounding the lens at a close distance and having an opening of about the diameter of the lens, wherein the light-impermeable ring-shaped cover includes an opening for receiving a lamp for a parking light, wherein the motor vehicle is provided with an opening for a parking light, wherein the reflection region of the light-impermeable ring-shaped cover is formed like a valley recess around the opening for the parking light, and wherein the valley recess forms a reflector matching the position of an coiled filament wire of the parking light;

a light-transmitting protective plate fixedly disposed in front of the lens and light-impermeable ring-shaped cover and covering the lens and the light-impermeable ring-shaped cover, where the side of the light-impermeable ring-shaped cover toward the light transmitting protective plate is provided with a reflective surface.

* * * * *